Patented Oct. 23, 1945

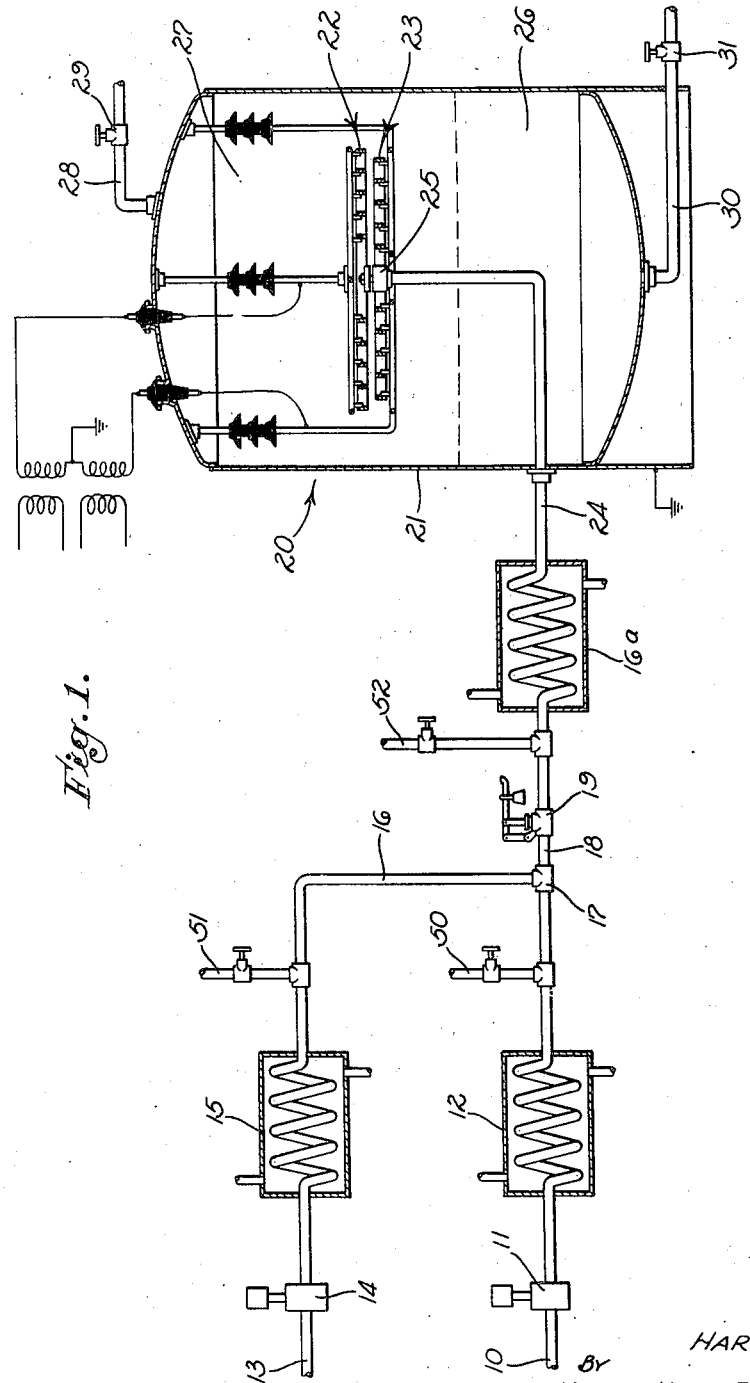

2,387,250

UNITED STATES PATENT OFFICE 2,387,250

METHOD FOR TREATING OIL

Harold C. Eddy, Los Angeles, Calif., assignor, by mesne assignments, to Petrolite Corporation, Ltd., Wilmington, Del., a corporation of Delaware Application April 3, 1939, Serial No. 265,699

12 Claims. (Cl. 204—190)

This invention relates to methods and apparatus for treating oil and, more particularly, to a process in which water-dispersible impurities, such as water-soluble and water-wettable impurities are removed by an electric process from an oil in which they may be dispersed or dissolved.

The removal of water-wettable or water-soluble impurities from oil is frequently a difficult problem, particularly in those instances where the impurities are present in the oil as a stabilized emulsion or dispersion. A notable instance is the problem of removing dispersed brine or salt from crude petroleum. The presence in the oil of salts such as are carried by, or produced from, oil-field brines is very undesirable from the standpoint of refining, since it leads to the formation of objectionable scales and deposits, with consequent stoppage or reduction in heat transfer, in refining equipment such as heat exchangers, pipe stills, cracking units and the like, to the liberation of corrosive acids, such as hydrochloric acid, arising from hydrolysis of the salts at the high temperatures employed in refining, and to the production of petroleum products below desired standards of quality.

The brines usually associate with crude petroleum in the form of a stable emulsion or dispersion therein. In some instances where the water content of the crude oil emulsion is high, the salt content of such oils may be partially reduced by subjecting them to known dehydration methods, such as settling at high temperature, direct treatment with a high-tension electric field, and the like, which methods remove salts somewhat in proportion to reduction in water content. The dehydrated oil is of low water content but the degree of salt reduction obtainable by such processes is insufficient to reduce the dispersed-phase material to the point that the residual salt content of many oils can be safely disregarded.

Attempts simply to wash the low-water-content oils are likewise usually unavailing since the brine droplets and other dispersed impurities are not only in a very finely dispersed condition in the oil, but are also protected or stabilized by the adsorption at the interface of emulsifying agents naturally present in the oil, both of which conditions tend to preclude the necessary coalescing contact between the water and the dispersed particles.

The problem with which the present invention is primarily concerned is the removal of water-soluble or water-wettable impurities from an oil. This oil should preferably be of low water content, for example, a refinery charging stock or a pipe-line oil. Such pipe-line oils ordinarily contain not substantially more than about 3% of dispersed water, usually considerably less, and may be the result of dehydrating crude oil emulsions by various means or of blending oils of higher and lower water content. The process is also applicable to the purification of oils containing substantially no water and to topped oils or fractions obtained through distillation steps, these being included in the term "low-water-content" oils as herein used.

If the impurities are associated with minute water droplets present in the oil to be treated, the purification proposed by the present process is not dependent upon any large reduction in water content. The oils with which this process is primarily concerned cannot be purified to any great degree through attempts merely to reduce the water content, by dehydration steps for example, since the "cut" or water content of these oils is already so low that substantial further reduction of the cut is difficult or impossible by any economically practical dehydrating process. In the present invention, a treated oil of low salt content can be obtained even though the water content of the treated oil is commensurate with that of the incoming oil. However, to maintain the salt content of the processed oil within very low limits, the water content of the incoming oil should be low. If the oil has a higher water content, it should be first reduced by any of the well known dehydration methods to produce an oil well adapted to the present purification process. The process can sometimes be used to advantage even if the water content is somewhat above 3% though, in many of its most valuable applications, the water content may be below 1%.

I have previously proposed a process for the electrical purification of such oils (see my co-pending application, Serial No. 122,470, now Patent No. 2,182,145), which can be exemplified by describing the mode of operation in purifying an oil of low water content, and in which the impurities are associated with small water droplets which are rather tenaciously dispersed in the oil. In the previous process, additional water droplets are dispersed in the oil to coexist predominantly with the original droplets. The added water is ordinarily fresh water but need not be distilled water, and may contain various chemicals, either naturally present or added thereto. However, this added water should contain less of the impurities to be removed than does the water comprising the original droplets suspended in the oil, for the process acts in large measure to replace some of the original droplets with droplets of the added water. The resulting dispersion, containing the coexisting droplets, is subjected to the action of an electric field which coalesces the original and added droplets, permitting removal from the oil of the coalesced masses which contain the impurities previously associated with the original water droplets. In addition, further impurities not originally associated with the brine droplets may become associated with the added water and be removed by this process, e. g., strong acids originally in solution in the oil, as well as water-wettable solids originally dispersed in the oil in an oil-wetted condition. In general, the process produces unexpected results in the reduction in evolvable HCl appearing when the oil is subjected to a refining action, for example by heating to distillation or cracking temperatures.

In mixing the added water into the oil, it has been found desirable to use such mixing as will produce a resulting dispersion which can be continuously resolved by the electric field to produce a purified oil of low water content and a body of water which is substantially oil-free. Such a mixture can be effectively produced by a mixing valve in which the mixing action and the pressure drop across the valve can be controlled by changing the force applied to the movable member. It has been found on some oils that, if the mixing action is very gentle, the impurity-extracting efficiency of the process is relatively low but increases as the pressure drop across the valve is made somewhat higher. However, a point is soon reached where there is a marked decrease in the ability of the field to resolve the dispersion continuously into oil and water, with no building up of unresolved sludge. Further, if homogenization is resorted to, i. e., by a mixing action so intense as to reduce the particle size of the original droplets, the dispersion becomes such as to be incapable of complete continuous resolution into oil and water. This decrease in the ability of the field to continuously and completely resolve the dispersion is commonly evidenced by building up or accumulation of a layer of sludge between the bodies of oil and water. Such sludge is a distinct problem in this art as it cannot be readily disposed of through sewage systems or by discharge into lakes, rivers, etc. Also, the oil content thereof represents an economic loss and, if the sludge layer is permitted to build up or accumulate in the treater, it will short-circuit the electrodes and render the process inoperative. Correspondingly, any long-continued operation must resolve this sludge or prevent its continued accumulation in the treater.

In the previously-proposed process, the mixture giving best results appears, when microscopically studied, as a continuous oil phase in which droplets of the added water coexist with droplets of the original water. In general, the average size of the droplets of added water is somewhat larger than the droplets of the original water and, in most instances, the added water droplets may be of a heterogeneous particle size. Some of the droplets of added water are of a size commensurate with the droplets of the original water, and it is believed that these smaller droplets of added water play an important part in the purifying process.

However, some oils contain such an amount of natural emulsifying agents as to make difficult the electric coalescence of such small droplets of added water with the impurities, even though the presence of such small droplets would otherwise be desirable. It will be understood that such emulsifying agents have already stabilized the original brine droplets of the incoming oil. When the added water is mixed with this oil, the dispersed particles of added water also become rapidly stabilized due to adsorption on their interfaces of the emulsifying agents naturally present in the oil. This latter condition hinders the desired coalescence of droplets of original and added water under the action of an electric field and, on some oils, care must be exercised in my previously-proposed process to avoid the fine particles of the added water which, from the standpoint of efficiency of purification, might be otherwise desirable. It may be noted in this respect that minute droplets are inherently more difficult to coalesce by electric action than are larger droplets and, in addition, afford a large interfacial area for adsorption. The increased difficulty of treating under these circumstances is sometimes reflected in decreased efficiency of purification, although this may not always be the case. As a rule, the difficulties manifest themselves by the appearance of a layer of coarse emulsion or sludge floating between the layers of purified oil and separated water. The quantity of this sludge tends to increase or accumulate with continuing throughput until it may short-circuit the electric field or pervade the entire body of separated water and be withdrawn through the water bleed to create an objectionable "sludge bleed."

It is an object of the present invention to provide a process in which the objectionable effects of natural emulsifying agents are at least partially overcome, in which the tendency to produce sludge may be successfully combatted, and in which the water separates from the treated constituents in a state which is substantially free of entrained oil.

It is also an object of the present invention to provide an electrical purification process in which a somewhat more intimate mixing action can be used than in the previously-proposed process, and in which some of the added water may be present in droplets of small size, without production of a dispersion which cannot be continuously and substantially completely resolved into a body of purified oil and a body of water which is substantially oil-free.

It is also an object of the present invention to provide a process in which a greater degree of purification may be obtained and in which the efficiency of the process is improved.

In accordance with this invention, a deemulsifying agent or a surface active agent adapted to resolve water-in-oil emulsions is added in limited amount during the purification process to combat the effects of the natural emulsifying agents in the oil which tend to stabilize water-in-oil dispersions. These agents are added in such manner as to decrease or prevent the formation of sludge, to increase the efficiency of salt removal or the removal of other impurities, and to maintain the water finally separting from the process substantially free of entrained oil. By "deemulsifying agent," I have reference to surface active agents which tend to reduce the stability of the water-in-oil emulsions formed or present in the process, i. e., agents which, if added in sufficient quantity, would themselves cause at least partial resolution of such emulsions. By "surface active agents," reference is had to materials which concentrate preferentially at boundary layers and which, at the small concentrations employed, have no substantial effect on the general composition of the phases concernced such as might be reflected in material changes in density, pH, or like alteration of one or more of the constituent phases.

The deemulsifying agents are not added in such quantity as to break the emulsion or prevent its formation, or cause inversion of the phases. It is essential that the added water be dispersed in the oil to produce an oil-continuous emulsion. It is, likewise, desirable to form an emulsion in which the added water droplets will not preferentially coalesce without joining with a large portion of the original water droplets, and it is desirable to have some small droplets of the added water which resist mutual coalescence to a sufficient degree that the dispersed impurities are combined therewith in the electric field, yet these small particles must not be so stabilized as to render impossible electrical coalescence with the original droplets. Consequently, the proper balance of emulsifying tendencies is obtained only when the concentration of the added deemulsifying agent is limited, and it is not desired to use such an amount of deemulsifying agent as would entirely overcome the action of the natural emulsifying agent and break the oil-continuous emulsion or prevent its formation.

Experience has shown that the "adsorption age" of a dispersion has much to do with its susceptibility to complete and continuous resolution by the action of an electric field. In most dispersions, stabilization does not occur instantaneously and it is often found that fresh dispersions can be readily resolved, but that, if permitted to age, they become increasingly difficult or impossible to resolve completely. The adsorption age of a dispersion is not dependent entirely upon chronological considerations, though these are important, but involves also the character of the emulsifying agents. Correspondingly, definite time limits for stabilization to form untreatable systems cannot be given, since these differ from system to system.

In the present process, I have found it very advantageous to have the deemulsifying agent effectively present at the time that the new interfaces are formed between the added water and the oil, or at least very soon thereafter and before the interfaces have become stabilized with the natural emulsifying agent. In operating in this manner, I am able to obtain a concurrent adsorption of the natural emulsifying agent and the added deemulsifying agent at the interface around the added water droplets. I thereby obtain a mixed interface, the stability of which may be very readily controlled to obtain the desired balance of emulsifying tendencies by appropriately controlling the concentration of the deemulsifying agent in the system. This is in substantial contrast to the results obtained when a deemulsifying agent is added to an aged emulsion which has already become stabilized and in which the interfaces have been saturated by adsorption of their full complement of the natural emulsifying agents present in the oil. Under these latter conditions, a deemulsifying agent is effective only when it is of such character as to be very strongly adsorbed at the interface, thereby enabling it to replace, in part, material previously adsorbed. It is, therefore, necessary to use substantially more of the deemulsifying agent on an aged emulsion in order to force the replacement action to occur with appreciable velocity. Furthermore, compared with the freshly formed dispersion in which interfacial adsorption is still incomplete, not only is it necessary in the case of an aged emulsion to use a stronger or more powerful deemulsifying agent and to add it in substantially larger amounts, but the regulation of the adsorption to produce a mixed interface exhibiting the desired balance of emulsifying and deemulsifying tendencies becomes much more difficult to control.

I have found, in accordance with the above principles, that the most advantageous results are obtained by adding the deemulsifying agent either prior to the step of dispersion, as by adding it to the oil or to the water which is to be dispersed therein, or by adding it to the dispersion during or immediately after its formation, whereby concurrent adsorption may take place. I find it particularly advantageous, moreover, to add the deemulsifying agent to the oil prior to dispersing the water therein.

Further objects and effects of the invention will be apparent from the following discussion of the drawing, in which:

Fig. 1 illustrates schematically a suitable flow scheme for the practice of my process.

Referring to Fig. 1, 10 is a pipe connected to a source of supply of impure oil which it is desired to treat, for example a dehydrated oil containing impurities in small droplets of water suspended therein, in this example brine. The oil is caused to pass through the pipe 10 by the action of a pump 11 and is brought to a suitable temperature by passage through a heat exchanger 12.

A pipe 13 is connected with a suitable supply of relatively fresh water, for example, well water, surface water, steam drips, or other water, the salinity of which is substantially less than that of the brine which it is desired to remove from the oil. The water is conducted through the pipe 13 by means of a pump 14 and brought to suitable temperature by passing it through a heat exchanger 15. The water is then conducted through a pipe 16 to a juncture 17, at which point it is introduced into the flowing stream of heated oil.

Some degree of dispersion may take place at the point of introduction, depending upon the turbulence with which the water is admixed with the oil. Further controlled dispersion is provided for, however, by passing the combined streams through a pipe 18 and a weight-loaded valve 19. By suitably controlling the loading on the valve 19, the water may be dispersed to the desired degree. The oil-continuous dispersion thus obtained may be further heated, if desired, in the heat exchanger 16a, whence the dispersion is conducted directly to an electrical treater 20.

Various types of electrical treaters may be used in my process but I find that excellent results are obtained by using a treater of the type schematically indicated in the drawing. This treater comprises a closed tank 21 containing vertically-spaced electrodes 22 and 23, each consisting of a series of concentric rings insulated from the tank 21. These electrodes are electrically energized by suitable connections brought in through insulating bushings from a source of alternating high potential exterior to the tank. The dispersion is introduced into the tank 21 through a pipe 24 which continues through the wall of the tank and rises centrally therein to a horizontal distributor or spray head 25 positioned between the electrodes. This spray head is advantageously constructed to comprise a spring-loaded orifice disposed as a cylindrical annulus adapted to jet the dispersion horizontally and radially outward across the electric field set up between the electrodes. In practice, it is frequently advantageous to operate with sufficient loading on the spray head so that some further degree of dispersion may take place just before entry into the electric field, though this is not essential in all instances. The process of dispersing the water in the oil may thus be regarded as taking place throughout the entire travel of the admixed streams of oil and water from the point of their juncture 17 to their issuance through the spray head 25, although the primary point of dispersion is, of course, the weight-loaded valve 19.

Under the action of the electric field, the dispersed particles of water and impurities coalesce to form larger masses or aggregates which have sufficient mass to respond to gravitational settling. The tank 21 is preferably constructed to have sufficient capacity to allow the desired settling to take place in the treater, forming a lower body of separated water 26 and an upper layer of purified oil 27, though separation in a separate vessel can be employed. Oil and water are respectively withdrawn from the top and bottom of the tank 21 through pipes 28 and 30, respectively, the rates of withdrawal being adjusted to correspond with the rates of production, by appropriate adjustment of valves 29 and 31 so that the water level in the treater 20 is maintained substantially constant.

The treaters are preferably operated at elevated temperature, for example, from 100° F. to the boiling point of water at the prevailing treater pressure, about 180° F. giving good results in many instances. Likewise, the treaters are preferably operated at slightly superatmospheric pressure, for example, 10–25 lbs./sq. in. gauge. Various amounts of water may be used, for example, from 10% to 40%, based on the volume of the impure oil.

The weight-loaded valve is preferably loaded to an extent sufficient to disperse the water as a heterogeneous dispersion, i. e., as droplets which vary substantially in size and, preferably, of such size distribution that at least a portion of the water droplets are of a size commensurate with the size of the coexisting dispersed impurities. In general, a very coarse dispersion will not accomplish as great a degree of purification as a finer dispersion. However, there are limits to the degree of dispersion which may be employed. In the first place, it is highly undesirable to load the valve to the extent that substantial homogenization takes place. Such homogenization produces various detrimental effects, such as the disruption of the original dispersed particles into smaller particles less accessible for removal, or combined coalescence and disruption whereby the added water and original impurities are jointly formed into a very fine dispersion of diluted brine in either case resulting in stabilization of the disperse phase to a degree that makes it unsuitable for further continuous electric processing. In the second place, a limitation may arise, in the case of oils containing natural emulsifying agents, whereby valve loadings far short of those producing homogenization, and in the range desired for adequate desalting, become impractical because of sludge accumulation during separation. This second limitation may be removed, however, by the practice of my present invention, namely, by the addition of deemulsifying agents to the oil or water, or to the dispersion shortly after its formation.

For example, it was found in the case of one oil, which contained only a small concentration of naturally-occurring emulsifying agents, that a loading on the emulsifying valve sufficient to produce a pressure drop of 5 lbs. could be used without formation of sludge and, at this loading, 90% of the salt was removed by the process. When the loading was decreased to give a pressure drop of only 3 lbs., using the same amount of water, only 70% of the salt was removed. When treating another oil containing a substantial concentration of natural emulsifying agents, about 70% of the salt could likewise be removed by a loading giving a 3 lb. pressure drop. Attempts to increase the salt removal in this second case by increasing the loading were found impracticable, however, for, while a decreased salt content in the purified oil could thus be obtained, there was a concomitant formation of sludge which appeared in the water bleed in the form of clusters of coarse or honey-comb emulsion comprising oily membranes surrounding cells of water. A small amount of deemulsifying agent added to the impure oil before dispersing the water therein was found to completely prevent the formation of this sludge even when the pressure drop across the emulsifying valve was as high as 10 lbs., whereby somewhat over 95% of the salt could be satisfactorily removed. The deemulsifying agent thus not only permitted the use of adequate dispersions but, in addition, increased the degree of desalting obtained by such a dispersion. This is further borne out by the fact that the second oil, when modified by the agent and processed with only a 3 lb. pressure drop, underwent a salt reduction of substantially more than 70%.

The deemulsifying agent may be added to the system in various manners. For example, it may be added to the oil or to the water as a body, or it may be added to the flowing streams thereof. In the drawing, a valve inlet pipe 50 has been provided on the oil pipe for the addition of a deemulsifying agent to the flowing stream of oil and, similarly, a valved inlet pipe 51 has been provided on the water pipe 16 for the addition of a deemulsifying agent to the flowing stream of water. The drawing also shows a valved inlet pipe 52 which permits the addition of a deemulsifying agent to the flowing stream of dispersion between the weight-loaded valve 19 and the heat exchanger 16a.

By the addition of the deemulsifying agent either to the flowing stream of oil or to the flowing stream of water, or to the bodies of oil or water from which these streams originate, the deemulsifying agent is effectively present at the time of admixture and during all subsequent dispersion steps, whereby concurrent adsorption is readily realized. Good results can sometimes be obtained by adding the deemulsifying agent after passage of the mixture of oil and water through the weight-loaded valve 19, as by addition through the valved inlet pipe 52. Under these circumstances, the added agent becomes available for adsorption at the interfaces before the latter have become saturated with the natural emulsifying agents in the oil and, furthermore, fresh interfaces may be produced subsequent to such addition, arising from turbulence in the heat exchanger 16a and pipe 24 and, in particular, during passage of the dispersion through the spring-loaded spray head 25.

In practice, I find that, while the deemulsifying agent will give the desired results when added to the water or to the dispersion shortly after it is formed, it is frequently most advantageously utilized when it is added to the oil or to the oil stream, preferably as an oil-soluble compound or mixture. As a rule, addition of the deemulsifying agent to the oil stream is more efficient in that less of the agent may be required, and it may also result in a more marked improvement in suppressing sludge and removing impurities.

The deemulsifying agent is preferably introduced at any of the described points in a positive and controlled manner such that the proportions thereof may be controlled with respect to the quantity of oil being treated. For example, the deemulsifying agent may be injected into the appropriate line by means of a positive displacement pump driven in known relation to the pumps 11 and/or 14, whereby the desired concentration of deemulsifying agent in the oil may be readily maintained.

In general for most economical operation, the quantity of deemulsifying agent should not be substantially more than required to maintain the water bleed through the pipe 30 substantially free of entrained oil, which may be readily determined by inspection. In most instances, the quantity of deemulsifying agent thus determined will also suffice to markedly improve or enhance the degree of purification.

As a rule, I prefer to use a deemulsifying agent which is soluble or readily dispersible in the oil and fairly insoluble in water. Such an agent may be readily and uniformly admixed with the oil, with which it is miscible, or with the oil-continuous emulsion produced in the process. It may also be effectively introduced into the system by addition to the water in which it forms a disperse phase which subsequently transfers to the oil after contact of the water with the oil. Deemulsifying agents which are soluble in both oil and water can be similarly used but are not normally as efficient as the exclusively oil-soluble compounds.

A wide variety of deemulsifying agents suitable for the resolution of water-in-oil emulsions are known, for example, those disclosed in the following U. S. Patents: Nos. 1,976,602; 1,977,048; 1,977,-089; 1,977,146; 1,978,227; 2,000,717; 2,023,976; 2,023,979; 2,023,993; 2,023,995; 2,026,217; 2,050,-923; 2,052,284; 2,077,230; 2,077,746; 2,078,652; 2,081,005; 2,104,793; 2,106,240; 2,110,849; and 2,127,905. The deemulsifying agents disclosed in such patents are organic deemulsifying agents. These and other known agents vary in efficiency and effectiveness as deemulsifying agents according to the character of the emulsion being treated, for example, according to the physical and chemical characteristics of the oil, the nature of the natural emulsifying agents, and the composition of the disperse phase. Hence, the determination of the most suitable deemulsifying agent for a given oil or emulsion is best made empirically by laboratory or pilot tests on the particular oil being processed, as is well known to those skilled in the art.

In general, the quantity of agent used is substantially less than that required to break or prevent the emulsification of the water in the oil. I find that excellent results are obtained when using from 1/20 to 1/2, i. e. 5 to 50%, of the amount of deemulsifying agent that would be necessary to break the emulsion formed in the process in the absence of the electric field. When using concentrated deemulsifying agents, such as are commercially available, I find that I obtain very advantageous results by adding them in proportions of about two-tenths of a gallon of deemulsifying agent per 1000 barrels of impure oil up to about two gallons of deemulsifying agent per 1000 barrels of impure oil.

While the process has been particularly described with regard to the removal of impurities normally associated with crude petroleum, such as dispersed brine particles, salt crystals, and the like, the advantageous use of the process is by no means limited to such a specific application. It may be used to purify crude oils, reduced oils, various charging stocks, and distillates.

The impurities which are effectively removed may comprise water-soluble impurities which may be originally present in the oil as dispersed droplets of aqueous solution, e. g., as brine droplets, or which may be originally dispersed in the oil in the form of solid particles of water-soluble compounds, e. g., as salt crystals, or which may be originally dissolved in the oil or brine, for example, water-soluble acids originally in solution in both the oil and brine. In addition, solid impurities which are insoluble in water may be removed if they are water-wettable. Such solids may be initially dispersed in the oil but are coalesced with the water droplets under the action of the electric field, and, becoming wet by the water, are subsequently removed with the aqueous phase. In general, the water-soluble or water-wettable impurities removable by this process may be termed "water-dispersible" impurities.

As indicated, the process is adapted to remove impurities which are dissolved in the oil but which have a partition coefficient substantially in favor of the aqueous phase, for example, hydrochloric acid. Thus, hydrochloric acid may be substantially removed from crude oil along with salt and brine particles in the ordinary practice of my process, hydrochloric acid dissolved in the oil and/or brine being frequently encountered in crude oils produced from wells which have been acidized or treated with hydrochloric acid. However, the removal of such oil-dissolved impurities need not be merely incidental to the removal of dispersed impurities. For example, it may be advisable to disperse small droplets of water in an oil in which hydrochloric acid is the sole impurity in order to obtain sufficient interfacial area to permit the rapid and complete transfer of this impurity into the aqueous phase. Adequate dispersal of the water, however, may result in stabilization of the artificial emulsion as set forth above, and, in this connection, the use of deemulsifying agents as comprised in my invention becomes of great advantage.

Where the impure oil is in the form of an emulsion having aqueous droplets such as brine as the impure disperse phase, the water content of such an emulsion should be relatively low, as discussed above. Dry oils and emulsions containing a small amount of water, for example, from 1% to 3% of water, are excellently adapted for my process, and emulsions containing even more water may be advantageously treated in many instances. Emulsions having a very high brine content, however, are preferably subjected to a dehydration process prior to treating to convert them into relatively dry oils having a water content within the desired limits.

The details of the above examples are illustrative only and various modifications of the described process may be employed without departing from the scope of my invention as defined in the appended claims.

I claim as my invention:

1. A process of purifying low water content mineral oils to remove water-soluble or water-wettable impurities contained in said oils which oils also contain naturally-occurring emulsifying agents tending to stabilize droplets of relatively fresh water when dispersed in the oil, comprising: forming an emulsion by dispersing relatively fresh water in said oil in the presence of an organic deemulsifying agent in an amount from approximately 5 to 50% of the amount required to break said emulsion in the absence of an electric field, whereby an oil-continuous emulsion is obtained, said dispersing step being performed by mixing the oil and the relatively fresh water with such intensity as to disperse this water in the oil to form droplets coexisting with original impurities; subjecting said oil-continuous emulsion to the action of an electric field of sufficient intensity to coalesce in a large measure the dispersed water and impurities; separating the electrically-treated constituents to produce a body of purified oil substantially freed from the undesired impurities and a body of substantially oil-free water comprising the impurities removed from said oil; and separately recovering the purified oil.

2. A process for extracting water-soluble and water-wettable materials from low water content impure mineral oil as an aqueous extract substantially free from oil, which comprises: adding relatively fresh water to the impure oil and agitating the oil and the relatively fresh water to produce an oil-continuous emulsion having a dispersed phase comprising particles of added water coexisting with original impurities, at least the last stages of said agitation being effected in the presence of an added surface-active organic deemulsifying agent, the amount of said deemulsifying agent added being substantially less than that required to completely destabilize said emulsion in the absence of an electric field and being between about 0.2 and 2 gallons of deemulsifying agent per 1000 barrels of oil; subjecting the emulsion thus formed to the action of a high-tension electric field to coalesce the dispersed water and impurities; separating the electrically-treated constituents to produce a body of oil substantially freed of the undesired impurities and a body of separated water comprising the impurities extracted from the oil; withdrawing substantially purified oil from said body of oil; and withdrawing water from said body of water.

3. A process as defined in claim 2 in which the surface-active material is a liquid and is added to the impure oil before dispersing the relatively fresh water therein.

4. A process as defined in claim 2 in which the surface-active material is a liquid and is added to the relatively fresh water before the same is dispersed into the impure oil.

5. A process of purifying an impure mineral oil of low water content to remove water-soluble or water-wettable impurities contained in said oil, comprising: adding to the impure oil an amount of surface-active organic deemulsifying agent between approximately 5 and 50% of the amount required to break in the absence of an electric field the emulsion produced in the succeeding step; dispersing a relatively fresh water in the oil thus treated by mixing the oil and relatively fresh water in such manner as to disperse the relatively fresh water in the oil to form dispersed droplets thereof coexisting with impurities to form an oil-continuous emulsion; subjecting the emulsion to the action of an electric field to coalesce the dispersed water and impurities; separating the electrically-treated constituents to obtain a body of oil substantially freed from the undesired impurities and a body of water comprising the extracted impurities; and separately recovering the oil.

6. A process for purifying mineral oil of low water content to remove water-soluble or water-wettable impurities contained in the oil and which oil also contains emulsifying agents, comprising: forming an emulsion by mixing with the impure oil a relatively fresh water containing an added surface-active organic deemulsifying agent, said mixing being of such character as to disperse the water containing the deemulsifying agent into the oil to coexist with impurities which it is desired to remove, said deemulsifying agent being added in an amount between approximately 5 and 50% of the amount required to break said emulsion in the absence of an electric field; subjecting the emulsion thus obtained to the action of a coalescing electric field, whereby the dispersed water and impurities are coalesced; separating the electrically-treated constituents to obtain a body of oil substantially freed from the undesired impurities and a body of separated water; and separately recovering the purified oil.

7. The process of removing dispersed saline impurities from a mineral oil of low water content containing emulsifying agents, which process includes the steps of: mixing a relatively fresh water with said oil to disperse droplets of relatively fresh water in the oil to coexist with dispersed saline impurities, said emulsifying agents tending to adsorb at the oil-water interface around the droplets of relatively fresh water to form an oil-continuous emulsion; adding a liquid organic deemulsifying agent antagonistic to oil-continuous emulsions to be present to adsorb at said interface concurrently with said adsorption of said emulsifying agents thereby producing a mixed interface, the amount of said deemulsifying agent added being substantially less than that required to completely destabilize said oil-continuous emulsion in the absence of an electric field and being from about 0.2 to 2 gallons of deemulsifying agent per 1000 barrels of oil; subjecting the oil-continuous emulsion thus obtained to the action of a coalescing electric field to coalesce the dispersed water and saline impurities; and separating the electrically-treated constituents to obtain a body of separated water containing the undesired saline impurities and a body of oil of low water content substantially freed from the undesired saline impurities.

8. A process of removing water-soluble and water-wettable materials from a mineral oil of low water content containing emulsifying agents, which process includes the steps of: mixing a relatively fresh water with said oil in a manner to form droplets of the relatively fresh water coexisting in the oil with impurities which it is desired to remove, said emulsifying agents tending progressively to adsorb at the oil-water interfaces around the droplets of relatively fresh water; immediately after such mixing, and before said interfaces become stabilized by said emulsifying agents, adding to said mixed oil and water a liquid organic deemulsifying agent antagonistic to oil-continuous emulsions to be present to adsorb at said interfaces concurrently with said adsorption of said emulsifying agents thereby producing a mixed interface, the amount of said deemulsifying agent added being substantially less than that required to completely destabilize such oil-continuous emulsion in the absence of an electric field and being between about 0.2 and 2 gallons of deemulsifying agent per 1000 barrels of oil; subjecting the oil-continuous emulsion thus obtained to the action of a coalescing electric field to coalesce the dispersed water and impurities; and separating the electrically-treated constituents to obtain a body of separated water containing the undesired impurities and a body of low-water-content oil substantially freed from the undesired impurities.

9. In a method of removing water-soluble or water-wettable impurities from a low water content mineral oil containing naturally-occurring emulsifying agents by an electric purification process involving the mixing of a relatively fresh water with the oil to disperse this water in the oil and produce an oil-continuous emulsion and continuously resolving the emulsion in a coalescing electric field, said mixing being of such character as to form an emulsion which can be substantially completely resolved with the aid of said electric field into oil and water without the accumulation of such amount of sludge as would interfere with the maintenance of the electric field, the improved method of avoiding sludging difficulties and increasing the amount of impurities extracted, comprising the steps of: increasing the intensity of mixing in said mixing step to a value which would otherwise cause such accumulation of sludge as would interfere with the maintenance of said electric field; and adding to the emulsion constituents before electric treatment and at a time no later than immediately after mixing the oil and relatively fresh water, a surface-active deemulsifying agent, said deemulsifying agent being added to such constituents at such position as to be present to adsorb concurrently with said emulsifying agents on the newly-formed oil-water interfaces around said droplets of relatively fresh water, the amount of said deemulsifying agent being substantially less than the amount required to completely destabilize said emulsion in the absence of an electric field, the increased-intensity mixing and the amount of said deemulsifying agent used being such that the oil-continuous emulsion produced is capable of being substantially completely resolved with the aid of said electric field into oil and water without the accumulation of such amount of sludge as would interfere with the maintenance of said electric field.

10. A continuous process for desalting a mineral oil of low water content containing small droplets of brine and which oil is derived by dehydrating a crude oil emulsion, said oil containing emulsifying agents sufficiently active to have stabilized said brine droplets to such an extent that they have resisted separation from the oil in the dehydration treatment, which process includes the steps of: continuously mixing relatively fresh water with said oil to produce an oil-continuous emulsion in which droplets of said relatively fresh water coexist with brine droplets in said oil, said emulsifying agents present in said oil tending to stabilize said droplets of relatively fresh water to such an extent that the resulting emulsion will be incapable of continuous substantially complete resolution into oil and water with the aid of a coalescing electric field without the accumulation of sludge to such an extent as to interfere with the operation of the electric field; adding an organic deemulsifying agent antagonistic to oil-continuous emulsions to coadsorb with said emulsifying agents at the interfaces between the oil and the droplets of relatively fresh water and before substantial stabilization of said relatively fresh water droplets by said emulsifying agents has occurred, the amount of said deemulsifying agent being substantially less than that required to completely destabilize said emulsion in the absence of an electric field and being from about 0.2 to 2 gallons of deemulsifying agent per 1000 barrels of oil and sufficient to prevent deleterious sludge accumulations in the succeeding separation step to such an extent as would interfere with the maintenance of said electric field at coalescing potential; continuously subjecting the resulting emulsion to the action of an electric field of sufficient intensity to coalesce the dispersed water comprising the droplets of relatively fresh water and brine to form separable masses of dilute brine; and separating the masses of dilute brine from the oil.

11. A process as defined in claim 10 in which said deemulsifying agent is added to said oil before mixing of said relatively fresh water therewith, and in which said deemulsifying agent is oil-soluble.

12. In a method of continuously desalting low water content mineral oils containing active emulsifying agents by an electric desalting process involving the mixing of a relatively fresh water with the oil to disperse this water in the oil and produce an oil-continuous emulsion and continuously resolving the emulsion in a coalescing electric field, said mixing being of such character as to form an emulsion which can be substantially completely resolved with the aid of said electric field into oil and water without the accumlation of such amount of sludge as would interfere with the maintenance of the electric field, the improved method of avoiding sludging difficulties and increasing the amount of salt extracted comprising the steps of: increasing the intensity of mixing in said mixing step to a value which would otherwise cause such accumulation of sludge as would interfere with the maintenance of said electric field; and adding to the emulsion constituents before electric treatment and at a time no later than immediately after mixing the oil and relatively fresh water, a surface-active deemulsifying agent, said deemulsifying agent being added to such constituents at such position as to be present to adsorb concurrently with said emulsifying agents on the newly-formed oil-water interfaces around said droplets of relatively fresh water, the amount of said deemulsifying agent being substantially less than the amount required to completely destabilize said emulsion in the absence of an electric field, the increased-intensity mixing and the amount of said deemulsifying agent used being such that the oil-continuous emulsion produced is capable of being substantially completely resolved with the aid of said electric field into oil and water without the accumulation of such amount of sludge as would interfere with the maintenance of said electric field.

HAROLD C. EDDY.